(12) United States Patent
Fischer et al.

(10) Patent No.: US 8,166,303 B2
(45) Date of Patent: Apr. 24, 2012

(54) METHOD FOR TRANSMITTING DATA AMONG COMPONENTS OF THE SYSTEM ELECTRONICS OF MOBILE SYSTEMS, AND SUCH COMPONENTS

(75) Inventors: Werner Fischer, Heimsheim (DE); Joachim Kunz, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 2731 days.

(21) Appl. No.: 10/400,247

(22) Filed: Mar. 27, 2003

(65) Prior Publication Data
US 2003/0194088 A1 Oct. 16, 2003

(30) Foreign Application Priority Data
Mar. 27, 2002 (DE) .................................. 102 13 658

(51) Int. Cl.
*H04L 9/00* (2006.01)
*G06F 21/00* (2006.01)
(52) U.S. Cl. ........................................ 713/176; 713/189
(58) Field of Classification Search .................. None
See application file for complete search history.

(56) References Cited

U.S. PATENT DOCUMENTS

| | | | | |
|---|---|---|---|---|
| 5,347,579 A | * | 9/1994 | Blandford | 713/176 |
| 5,995,624 A | * | 11/1999 | Fielder et al. | 713/169 |
| 6,032,257 A | * | 2/2000 | Olarig et al. | 726/35 |
| 6,144,927 A | * | 11/2000 | Grill et al. | 702/142 |
| 6,625,729 B1 | * | 9/2003 | Angelo et al. | 713/2 |
| 6,968,453 B2 | * | 11/2005 | Doyle et al. | 713/168 |
| 2001/0026632 A1 | * | 10/2001 | Tamai | 382/116 |
| 2001/0056544 A1 | * | 12/2001 | Walker | 713/200 |
| 2002/0095601 A1 | * | 7/2002 | Hind et al. | 713/201 |
| 2003/0009270 A1 | * | 1/2003 | Breed | 701/29 |
| 2003/0152145 A1 | * | 8/2003 | Kawakita | 375/240.12 |
| 2004/0034787 A1 | * | 2/2004 | Kitani | 713/189 |
| 2009/0138710 A1 | * | 5/2009 | Minematsu | 713/170 |

FOREIGN PATENT DOCUMENTS

| | | |
|---|---|---|
| DE | 35 34 216 | 4/1987 |
| DE | 196 10 161 | 9/1997 |
| DE | 198 10 159 | 10/1998 |
| DE | 199 55 545 | 5/2001 |
| DE | 100 08 973 | 9/2001 |
| DE | 100 18 374 | 10/2001 |
| WO | WO 95 01684 | 1/1995 |

OTHER PUBLICATIONS

Jantarang S. et al., "A low cost real-time intelligent taximeter sensor", Proceedings of APCCAS, col. 1, Oct. 28, 2001, pp. 217-220, XP0010620692, P+X-Schrift.

* cited by examiner

*Primary Examiner* — Christopher Revak
(74) *Attorney, Agent, or Firm* — Kenyon & Kenyon LLP

(57) ABSTRACT

A method for transmitting data among components of the system electronics of mobile systems, where, to increase the security of the information exchange, it is proposed to encrypt the data to be transmitted. To this end, devices for encrypting and/or decrypting data to be transmitted or received are provided in the relevant system electronics components.

9 Claims, 1 Drawing Sheet

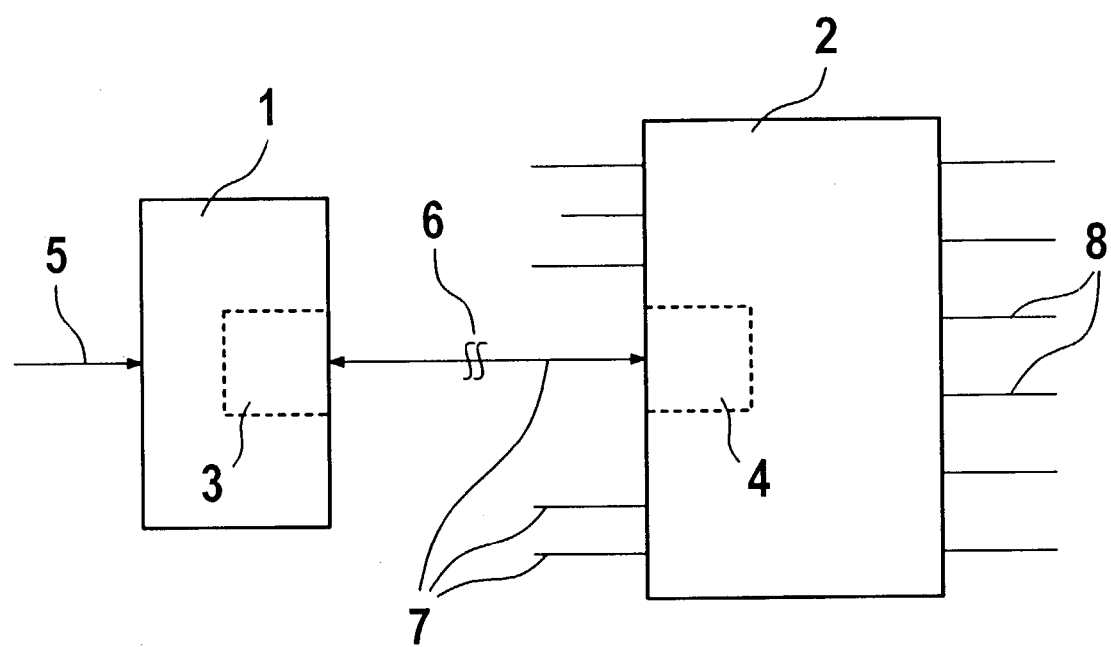

METHOD FOR TRANSMITTING DATA AMONG COMPONENTS OF THE SYSTEM ELECTRONICS OF MOBILE SYSTEMS, AND SUCH COMPONENTS

FIELD OF THE INVENTION

The present invention is directed to a method for transmitting data among components of the system electronics of mobile systems, as well as to system electronics components of this kind, such as sensors, control units, or actuators, having a device for transmitting and/or receiving data. The present invention is also directed to a computer program and a computer program product, each having a program code element for implementing the method according to the present invention.

BACKGROUND INFORMATION

Electronic control or regulation has established its importance in many areas of the system electronics of mobile systems, e.g., in motor vehicles or aircraft. In this context, both digital data exchange (e.g., bus systems), as well as analog signal transmission take place among the components of the system electronics. While appropriate protective measures substantially limit any possible manipulation of participating control units, in principle, signal-transmission, i.e., data-transmission paths can only be protected with great difficulty. In other words, the transmitted information can be manipulated relatively easily.

The need exists, therefore, to not only safeguard the units themselves from an unauthorized external access, but also to protect the data transmission to and from these units from external manipulation attempts. This applies both to the automotive sector (e.g., protection from engine tuning), but to an even greater degree to aircraft. In the automotive sector, it is particularly useful to safeguard the transmission path from the sensors to the control unit and from the control unit to the actuators, the data to be transmitted being available in analog or also in digital form, and in addition to unidirectional data transmission, in particular in the context of control systems, bidirectional data transmission being used as well.

SUMMARY OF THE INVENTION

Real-time encryption of the data to be transmitted among the components of the system electronics in accordance with the present invention renders possible a high security standard against manipulation attempts. One advantage of using encryption techniques is that various encryption methods may be selected in dependence upon the relevancy of the data to be transmitted, to security. In addition, encryption algorithms may be selected in consideration of the required data processing speeds, so that the encryption and decryption of data still results in an acceptable data transmission and data processing speed. The real-time encryption renders possible an interruption-free operation without buffering the data to be transmitted or the transmitted data.

The exchange of information in the vehicle's system electronics is protected by the method according to the present invention. It is thus ensured, for example, that the physical value recorded by a sensor is available in proper form in the control unit which evaluates this signal, and that the value output to an actuator to control the control unit is properly received by the same.

Since the encryption and the subsequent decryption are tuned to one another, it is ensured that components of the electrical system are only able to be replaced or reintegrated by the authorized location. This, in turn, makes it considerably more difficult for inferior components (counterfeit products) to be used.

The data to be transmitted are advantageously encoded by a key used by the transmitting component and decoded by another key used by the receiving component. In this encryption method, both keys may be identical (symmetrical method) or different (asymmetrical encryption). In the context of asymmetrical encryption, the data to be transmitted are encrypted by the receiver's so-called public key and subsequently decrypted again by the receiver's private or secret key. Since the transmitter and receiver do not have the same key, this form of encryption is recommended due to its high security, particularly in the transmission of data relevant to security.

In addition to a device for transmitting data, a system electronics component of a mobile system in accordance with the present invention, such as a sensor, a control unit or an actuator, has another device for encrypting and/or decrypting data to be transmitted or received, in real time. This device fulfills the requirements of a delay-free operation of the data-exchanging components.

It is advantageous in this context when the encryption and/or decryption of the data is carried out by a computer program having a program code element, when the computer program is executed on a computer or an appropriate computer unit, in particular on the mentioned encryption and/or decryption device of the system electronics component. The computer program may be permanently stored on an appropriate storage module of the system electronics component or be played via mobile storage media (such as diskettes), external storage media (such as hard disks), or also from other storage media via the Internet onto the appropriate system electronics component. Suitable storage media are, in addition, EEPROMs or flash memories.

BRIEF DESCRIPTION OF THE DRAWING

The FIGURE schematically depicts two system electronics components, each having devices for transmitting data, as well as devices for encrypting and/or decrypting data in accordance with the present invention.

DETAILED DESCRIPTION

The FIGURE shows two components of the system electronics of a motor vehicle, selected by way of example, namely a sensor 1 and a control unit 2. The input line to sensor 1 is denoted by 5. Input lines 7 lead to the control unit; output lines 8 lead away from the control unit to other components of the system electronics, such as actuators. Typically, the data transmission between sensor 1 and control unit 2 takes place via an interface 6 (analog, PWM, bus . . . ). Sensor 1 has an encryption device 3; control unit 2 a decryption device 4.

Sensor 1 ascertains values, such as pressure, temperature, speed, charging pressure, etc. which generally represent physical quantities or which are derived therefrom. These sensor values are no longer represented, as in known methods heretofore, in the form of an analog electric signal (e.g., a voltage level) or a simple (open) digital message (such as a bus message, for example for a CAN), but rather, in accordance with the present invention, by an encrypted message. For this purpose, device 3 of sensor 1 undertakes an encryption of the sensor data, before they are sent via interface 6 to control unit 2. In the process, encryption methods may be employed, as are used in the area of electronic data processing in the context of networked computer structures (such as the Internet), (for example, RSA methods, asymmetrical encryption methods).

The encrypted message is made available via interface 6 to control unit 2, which, in a first step, undertakes the decryption of the message. Decryption device 4 is provided for this purpose. In this operation, control unit 2 recognizes whether the message was uncorrupted and if it was transmitted by the authorized transmitter. For this purpose, besides the actual encryption of the message, it may also be signed. Upon positive examination of the message by decryption device 4 in control unit 2, the decrypted data are further processed accordingly. For example, on the basis of this data, an actuator is driven by control unit 2 via an output line 8. If, on the other hand, the examination of the transmitted data in decryption device 4 has a negative result, control unit 2 may react in suitable fashion in that, for example, a reliable replacement value is selected which maintains a reliable operation, and in that, for example, the driver of the vehicle is informed accordingly.

The present invention also provides, in particular, that the described control unit 2 has other devices for encrypting and/or decrypting data received via input lines 7 and/or data transmitted via output lines 8. Thus, for example, for purposes of engine control, control unit 2 may transmit an encrypted control signal via one of output lines 8 to an actuator (not shown), (such as a throttle valve), an appropriate device for decrypting the received data then being connected in series to the actuator.

What is claimed is:

1. A method for transmitting data among components of a system electronics of a mobile system, comprising:
   encrypting the data to be transmitted by a transmitting component in real time, wherein the data to be transmitted includes one of a signature and an identifier of the transmitting component;
   decrypting the data by a receiving component in real time;
   examining the transmitted data for authenticity on the basis of at least one of a) an encryption algorithm and b) the one of the signature and the identifier; and
   if the examination of authenticity of the transmitted data turns out to be negative, using suitable replacement data in place of the transmitted data.

2. The method as recited in claim 1, wherein the data to be transmitted are encrypted by a key used by the transmitting component; and the data are decrypted by a key used by the receiving component.

3. The method as recited in claim 1, wherein:
   if the examination of authenticity of the transmitted data turns out to be negative, appropriate information is displayed in addition to the use of the suitable replacement data.

4. The method as recited in claim 1, wherein asymmetrical keys are selected for the transmission of data relevant to security.

5. A system electronics of a mobile system, comprising:
   a first component having a transmitting device for transmitting data and an encrypting device for encrypting the data in real time, wherein the encrypting device transmits an identifier of the first component, together with the data; and
   a second component having a receiving device for receiving the data and a decrypting device for decrypting the data in real time, wherein the decrypting device is equipped for examining an authenticity of the transmitted data, and wherein if the examination of the authenticity of the transmitted data turns out to be negative, the second component uses suitable replacement data in place of the transmitted data;
   wherein the mobile system includes one of a sensor, a control unit, and an actuator.

6. The system electronics as recited in claim 5, wherein:
   if the examination of the authenticity of the transmitted data turns out to be negative, appropriate information is displayed in addition to the use of the suitable replacement data.

7. A memory for storing a computer program for causing a transmission of data among components of a system electronics of a mobile system, an execution of the computer program resulting in a performance of:
   encrypting the data to be transmitted by a transmitting component in real time, wherein the data to be transmitted includes one of a signature and an identifier of the transmitting component;
   decrypting the data by a receiving component in real time;
   examining the transmitted data for authenticity on the basis of at least one of a) an encryption algorithm and b) the one of the signature and the identifier; and
   if the examination of authenticity of the transmitted data turns out to be negative, using suitable replacement data in place of the transmitted data.

8. The system electronics as recited in claim 5, wherein the mobile system is a motor vehicle.

9. The system electronics as recited in claim 5, wherein the mobile system is an aircraft.

* * * * *